(No Model.)
L. B. MOORE & M. S. LOVE.
PLANT PROTECTOR.
No. 411,347. Patented Sept. 17, 1889.
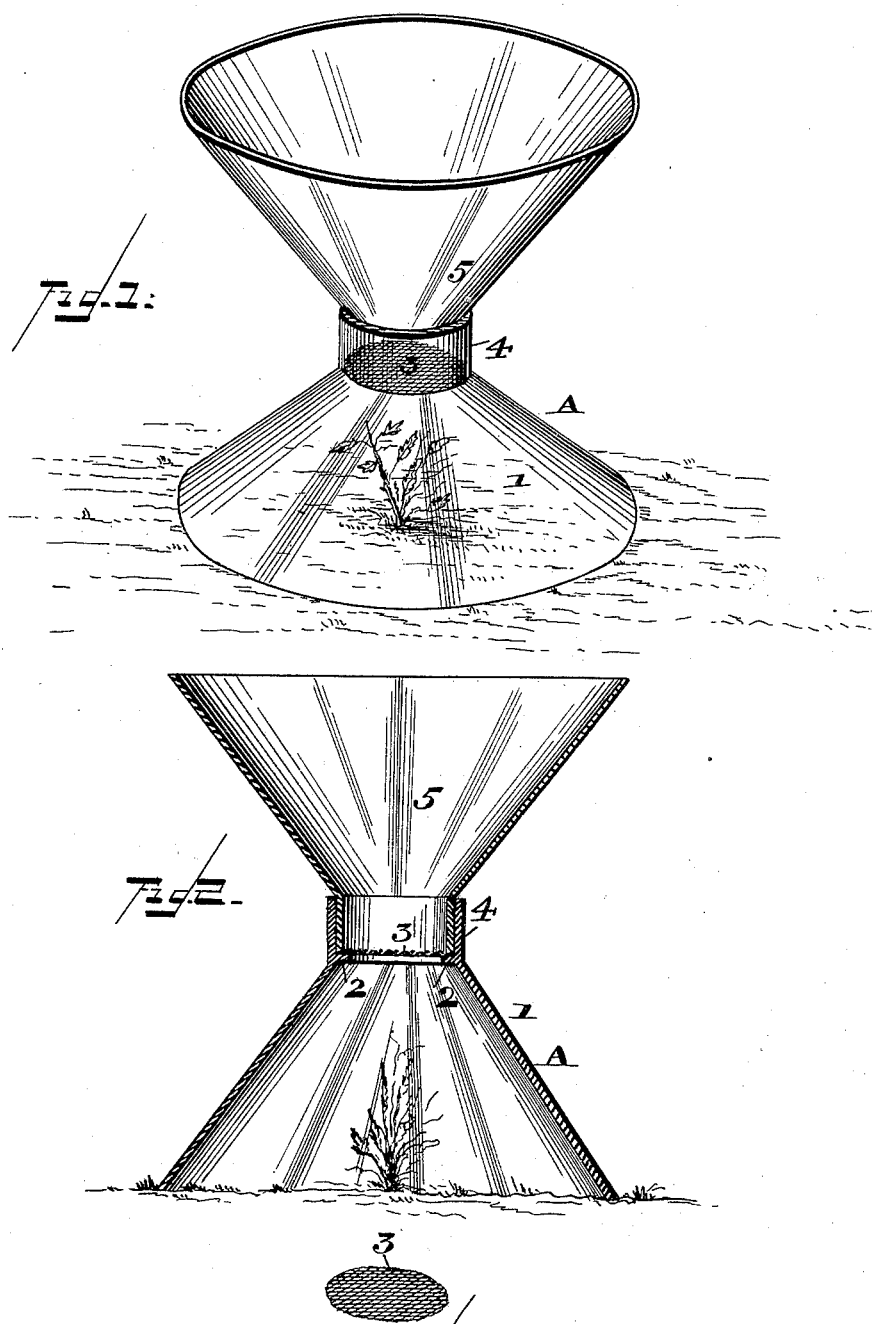

UNITED STATES PATENT OFFICE.

LINN BOYD MOORE AND MATTHEW SILAS LOVE, OF MORLEY, MISSOURI.

PLANT-PROTECTOR.

SPECIFICATION forming part of Letters Patent No. 411,347, dated September 17, 1889.

Application filed June 15, 1889. Serial No. 314,395. (No model.)

*To all whom it may concern:*

Be it known that we, LINN BOYD MOORE and MATTHEW SILAS LOVE, both residents of Morley, in the county of Scott and State of Missouri, have invented certain new and useful Improvements in Plant-Protectors; and we do hereby declare that the following is a full, clear, and exact description of the invention, which will enable others skilled in the art to which it appertains to make and use the same.

This invention relates to plant-protectors.

The object is to produce a device which will not only shelter a young plant from the cold wind and rain, but will also serve as a reservoir to collect moisture and precipitate the same upon the young plant, thereby aiding in its rapid development and early maturity; furthermore, to produce a device of the above description which shall be of the highest efficiency and durability in use and of the greatest simplicity in construction.

With these objects in view the invention consists in the improved construction and combination of parts of a plant-protector, as will be hereinafter fully described in the specification, illustrated in the drawings, and pointed out in the claim.

In the accompanying drawings, forming part of this specification, in which like letters of reference indicate corresponding parts, Figure 1 is a perspective view of our improved plant-protector. Fig. 2 is a vertical sectional view, and Fig. 3 is a detail view, of a wire-gauze used to regulate the ventilation, and also to exclude the entrance of bugs or other vermin to the plant.

Referring to the drawings, A designates the base portion of our device, consisting of a rectangular funnel 1, constructed preferably of glass, although this base portion may be made of any other suitable material which will admit light to the plant—such, for instance, as oiled paper, isinglass, or other analogous substance—but for cheapness and durability glass is preferred. At a point near the top of this funnel are formed inward-projecting flanges 2, upon which rests a gauze screen 3 for excluding the vermin from the young plant. This gauze screen may be either circular in form or square to agree with the shape of the funnel, and may be secured upon the flanges or allowed to lie thereon. Extending upward and beyond these flanges is a neck portion 4, in which fits another funnel-shaped portion or moisture-collector 5, also constructed of glass. The object of having this second funnel-shaped portion is that when it rains or when a heavy dew is falling it will be collected and precipitated upon the young plant below.

As seen in Fig. 1, the device is placed over a plant, and all air is excluded from the sides and ends, while the sunlight can penetrate the sides and beat upon the young plant, and by reason of the fact that the sides are made of glass the heat will be intensified, thus aiding in the rapid maturity of the plant.

It will be seen, readily, that, although this device is exceedingly simple of construction, it will be found of the highest efficiency and durability in use, and may be constructed at a slight expense.

Having thus fully described our invention, what we claim as new, and desire to secure by Letters Patent, is—

In a plant-protector, the combination of the base portion, the flanges formed at the top thereof, the wire-gauze resting upon the flanges, and a moisture-collector fitting in the said base portion and above the gauze screen, substantially as described.

In testimony that we claim the foregoing as our own we have hereunto affixed our signatures in presence of two witnesses.

LINN BOYD MOORE.
   MATTHEW SILAS LOVE.

Witnesses:
 J. B. HUDSON,
 W. McDONOUGH.